United States Patent Office 3,787,429
Patented Jan. 22, 1974

3,787,429
2-BENZYL AMINOPYRIDINE HAVING AT LEAST THREE SUBSTITUENTS IN THE BENZYL GROUP
Kurt Thiele and Walter E. von Bebenburg, Frankfurt, Germany, assignors to Deutsche Gold - und Silber-Scheideanstalt vormals Roessler, Frankfurt, Germany
No Drawing. Application July 11, 1969, Ser. No. 842,438, now Patent No. 3,712,900, which is a continuation-in-part of abandoned application Ser. No. 762,321, Sept. 16, 1968, which in turn is a continuation-in-part of application Ser. No. 637,322, May 10, 1967, now Patent No. 3,481,743. Divided and this application Oct. 7, 1971, Ser. No. 187,543
The portion of the term of the patent subsequent to May 19, 1987, has been disclaimed
Int. Cl. C07d 31/36
U.S. Cl. 260—295.5 C    8 Claims

ABSTRACT OF THE DISCLOSURE

There are prepared pharmacological compounds of the formula

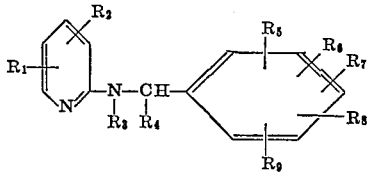

and their pharmacological acceptable acid addition salts wherein $R_1$ is amino, lower alkylamino, or amino acylated by carbonic acid, lower aliphatic monoesters of carbonic acid, aromatic monoesters of carbonic acid, benzoic acid, substituted benzoic acid, saturated or unsaturated straight or branched chain lower aliphatic mono or dicarboxylic acids, carbonic acid semi morpholide or carbonic acid semi piperidide, $R_2$ is hydrogen or $R_1$, $R_3$ is hydrogen, lower alkyl or acyl as defined for $R_1$, $R_5$, $R_6$, $R_7$, $R_8$ an $R_9$ are hydrogen, halogen, alkyl, trifluoromethyl, hydroxy, alkoxy, hydroxyalkyl, aliphatic acyl, carboxy or carboxyalkyl, $R_4$ is hydrogen, alkyl or

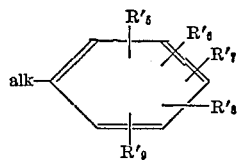

where alk is a 1 to 3 carbon atom straight or branched chain alkylene group which can be substituted with hydroxy, lower alkyl, lower alkoxy and $R'_5$, $R'_6$, $R'_7$, $R'_8$ and $R'_9$ have the same meaning as $R_5$, $R_6$, $R_7$, $R_8$ and $R_9$, when alk is unsubstituted at least one of $R'_5$, $R'_6$, $R'_7$, $R'_8$ or $R'_9$ is not hydrogen and if $R_4$ is hydrogen or alkyl at least 3 or $R_5$, $R_6$, $R_7$, $R_8$ and $R_9$ are not hydrogen.

CROSS-REFERENCE TO RELATED APPLICATIONS

This application is a divisional of our copending application Ser. No. 842,438, filed July 11, 1969, now Pat. No. 3,712,900, dated Jan. 23, 1973 which in turn is a continuation-in-part of application Ser. No. 762,321, filed Sept. 16, 1968 now abandoned, which in turn is a continuation-in-part of Ser. No. 637,322, filed May 10, 1967, now Pat. No. 3,481,743, dated Dec. 2, 1969. The entire disclosure of applications 637,322 and 762,321 is hereby incorporated by reference.

The present invention relates to pharmacological compounds of the formula

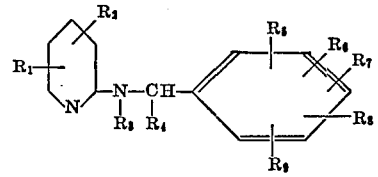

their pharmacologically acceptable acid addition salts and their optically active and diastereoisomer forms, wherein $R_1$ is amino, lower alkylamino (e.g. alkyl of 1 to 6 carbon atoms) or amino acylated by carbonic acid, lower aliphatic monoesters of carbonic acid (e.g. 1 to 6 carbon atom alkyl monoesters of carbonic acid), aromatic monoesters of carbonic acid (e.g. phenyl or tolyl monoester of carbonic acid), benzoic acid, substituted benzoic acids, saturated or unsaturated straight or branched chain lower aliphatic mono or dicarboxylic acids having 1 to 6 carbon atoms (e.g. acetic acid to hexanoic acid or maleic acid or fumaric acid), carbonic acid semimorpholide or carbonic acid semi piperidide, $R_2$ is hydrogen or the same as $R_1$, $R_3$ is hydrogen, lower alkyl (1 to 6 carbon atoms) or acyl as defined for the acylation of the amino group in $R_1$, $R_5$, $R_6$, $R_7$, $R_8$ and $R_9$ are the same or different and are hydrogen, halogen (e.g. chlorine, bromine or fluorine), alkyl of 1 to 6 carbon atoms, trifluoromethyl, hydroxy, alkoxy with 1 to 6 carbon atoms, hydroxyalkyl with 1 to 6 carbon atoms, aliphatic acyl with 1 to 6 carbon atoms (e.g. formyl, acetyl or caproyl), carboxy or carboxy alkyl with 1 to 6 carbon atoms in the alkyl group, $R_4$ is hydrogen, alkyl of 1 to 6 carbon atoms or

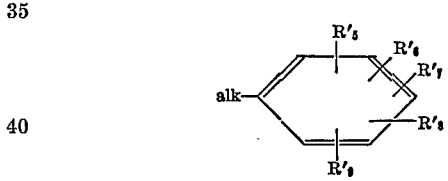

where alk is a 1 to 3 carbon atom straight or branch chain alkylene group which may be substituted with hydroxy, alkyl of 1 to 6 carbon atoms or alkoxy of 1 to 6 carbon atoms and $R'_5$, $R'_6$, $R'_7$, $R'_8$ and $R'_9$ are the same or different and have the same meaning as $R_5$, $R_6$, $R_7$, $R_8$ and $R_9$, provided that when alk is unsubstituted at least one of $R'_5$, $R'_6$, $R'_7$, $R'_8$ and $R'_9$ is not hydrogen and provided that when $R_4$ is hydrogen or alkyl at least 3 of $R_5$, $R_6$, $R_7$, $R_8$ and $R_9$ are not hydrogen.

As carbonic acid monoesters preferably there are employed those having a 1 to 6 carbon alkyl group, e.g. mono methyl carbonate, mono ethyl carbonate, mono propyl carbonate or mono hexyl carbonate. As substituents for the benzoic acid preferably there are employed alkyl of 1 to 6 carbon atoms, halogen (e.g. fluorine, bromine or chlorine), trifluoromethyl, hydroxy, alkoxy with 1 to 6 carbon atoms, hydroxyalkyl with 1 to 6 carbon atoms, aliphatic acyl with 1 to 6 carbon atoms (e.g. formyl, acetyl or caproyl), carboxy, carboxyalkyl with 1 to 6 carbon atoms. The mono or dicarboxylic acids are preferably substituted by an oxo group, a hydroxy group or an alkoxy group with 1 to 6 carbon atoms.

The new compounds of the invention are valuable therapeutic substance and possess especially good antiphlogistic and analgesic activity.

The production of the compounds of the invention can be carried out using conventional methods such as (a) Where a compound exists having General Formula I except that $R_1$ or $R_2$ both are a nitro group by reducing the nitro group to amino by known methods, (b) By reacting a compound of the general formula

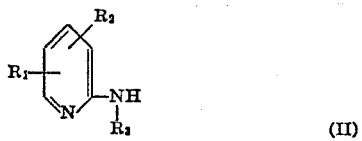

with a compound of the general formula

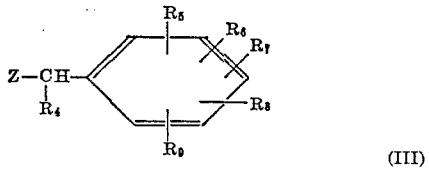

where Z is either a halogen atom or the group NHR₃ or the group OR₁₀ and R₁₀ is hydrogen, a lower alkyl group (1 to 6 carbon atoms) or phenyl, with or without a solvent, preferably in the presence of a condensation agent at elevated temperature, or (c) Condensing a compound of General Formula II with a compound of the general formula

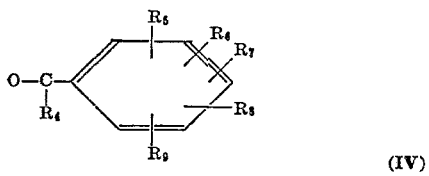

with simultaneous reduction, or (d) Reacting a compound of the general formula

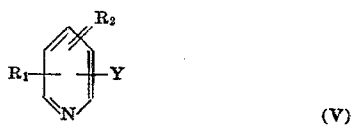

where Y is either a halogen atom, a hayroxy, a lower alkoxy (1 to 6 carbon atoms), phenoxy, the —SO₂CH₃ group or the —SO₃ group and W is hydrogen or alkali metal with a compound of the general formula

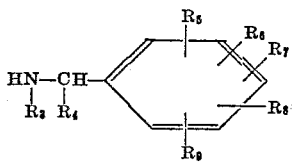

with or without a solvent as set forth in reaction (b), and jointly simultaneously or successively acylating amino groups present in a compound prepared by one of the processes (a) through (d) and/or in the case of a compound of Formula I whose acyl group is derived from an aliphatic ketoacid by reducing this keto group in known manner to hydroxy.

Compounds of Formula I which contain one or more

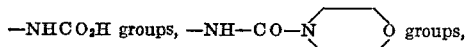

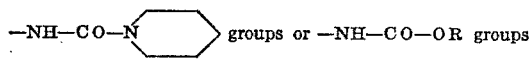

(R is a lower alkyl group, e.g. 1 to 6 carbon atoms), can be produced if compounds obtained by the above described process and possessing the —NH—CO—OR' group (R' is alkyl or phenyl) either are saponified in known manner to compounds having —NH—CO₂H groups or are reacted with morpholine or piperidine to form compounds having

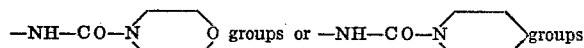

or are tranesterified with aliphatic alcohols to form compounds having —NH—CO—OR groups.

For the reduction according to process (a) catalytic hydrogenation has proven to be especially suitable. As catalysts there can be employed Raney nickel, noble metals such as palladium and platinum and compounds thereof with or without carriers, for example barium sulfate, calcium sulfate, etc. It is recommended that the hydrogenation of the nitro group be carried out at a temperature between 20 and 80° C. and a pressure of about 5 to 50 atmospheres (gauge) in a solvent, for example alcohols, e.g. ethyl alcohol, dioxane, tetrahydrofurane, etc. For the connected isolation of the reduced compounds it is an advantage in many cases if there is added at the beginning to the hydrogenation mixture drying agents such as water free sodium or magnesium sulfate.

The reduction can also be carried out with nascent hydrogen, for example zinc-hydrochloric acid, tin-hydrochloric acid, iron-hydrochloric acid or with salts of hydrogen sulfide in alcohol-water at 70 to 120° C. or with activated aluminum in aqueous ether at 20 to 40° C. or with stannous chloride-hydrochloric acid.

Processes (b) and (d) are suitably carried out at a temperature between 80° C. and 250° C. whereby in case of method (b) if Z is hydroxy higher temperatures up to 400° C. are necessary. Process (c) is suitably carried out at a temperature between 20 and 150° C.

As solvents for processes (b) through (d) there can be used water, alcohols, e.g. ethyl alcohol, benzene, toluene, dioxane, dimethyl-formamide, W-methyl pyrrolidone, dimethyl sulfone, sulfolane, tetramethyl-urea, etc.

As condensation agents for methods (b) and (d) in the event Z and Y signify a halogen atom of primary importance are, for example, sodium acetate, sodamide, alkali carbonates, e.g. sodium carbonate and potassium carbonate and tertiary amines. Zinc chloride, phosphorus oxychloride, p-toluenesulfonic acid, iodine and the like can be used as condensation agents for method (b) in case Z is NHR₃; zinc chloride, calcium chloride and triethyl phosphate can be used for example in methods (b) and (d) in the event Z and Y are a hydroxy group or the R₁₀O group.

Zinc chloride or copper bronze is suitable as the condensation agent in method (b) if Y is the SO₃W group.

The concurrent acylation of the amino group can be carried out according to conventional methods with the corresponding acid chlorides, acid anhydrides, ketenes or the corresponding esters.

If the R₃ carrying amino group is not acylated thereby there can be used as the acylating agent acid halides or acid anhydrides or ketene at temperatures below 60° C., preferably at 0 to 30° C.

In the presence of several amino groups of the abovementioned type a partial acylation is possible if there is used only a sufficient amount of acylating agent for one amino group.

The acylation of the amino nitrogen, which can be substituted by the R₃ residue, which likewise preferably follows the hydrogenation can likewise be carried out with acid halides or anhydrides, but held at a temperature above 60° C., preferably between 70 and 120° C. Thereby longer reaction times are necessary.

Frequently the hydrogenation solution directly from removal of the catalyst can be added for the acylation. Since the free amines for the most part are oxygen sensitive one works expediently in a nitrogen atmosphere.

The reduction of the keto group can be carried out for example with nascent hydrogen, catalytically stimulated hydrogen or with metal hydrides or complex metal hydrides such as NaBH₄, LiAlH₄, etc. With the use of NaBH₄ and catalytic hydrogenation there are suitable as solvents lower polar solvents such as methanol and isopropanol, if other complex hydrides are used suitable solvents include dioxane, tetrahydrofurane as well as other oxygen containing, slightly polar solvents. The reaction temperatures lie between 20 and 100° C. With catalytic hydrogen pressures between 1 and 50 atmospheres (gauge) are suitably employed. It goes without saying this reduction can also be carried out before the acylation of the amino group or groups.

The reaction of mono ester carbonic acid groups with an aliphatic alcohol is suitably carried out with an excess of the aliphatic alcohol which yields the alkyl group of the new ester. There are employed acid catalysts such as hydrochloric acid, toluene sulfonic acid, etc. and temperatures between 20 and 100° C. whereby the alcohol formed in the reaction is distilled if it is lower boiling than the newly introduced alcohol.

The compounds of the invention can be converted to their salts in conventional manner. As anious for the salts there can be employed the usual pharmacologically acceptable acid groups. Typical acids for forming the salts are hydrochloric acid, hydrobromic acid, sulfuric acid, phosphoric acid, acetic acid, propionic acid, citric acid, malonic acid, succinic acid, maleic acid, fumaric acid, lactic acid, p-toluene sulfonic acid and the like.

Those compounds which contain asymmetrical carbon atoms and as a rule accumulate as racemates can be split into their optically active isomers or diastereomers in known manner, for example by reaction with an optically and active acid and fractional precipitation or crystallization. It is also possible, however, to add optically active isomers or diastereomers as starting material. The optically active isomers are surprisingly more strongly active than would be expected from the activity of the corresponding racemate.

The compounds of the invention can be used in the production of pharmaceutical compositions. The pharmaceutical compositions or medicaments can contain one or more of the compounds of the invention as well as mixtures of these with other pharmacologically active materials. The production of medicaments can be carried out using the customary pharmaceutical carriers and additives. The compounds are useful as medicines in the human, and veterinary fields. The acid addition salts also can be used to cure resins, e.g. melamine-formaldehyde resins.

The pharmacological administration of the compounds is by the usual standard methods for administration of compounds, e.g. enterally, parenterally, orally, perlingually or in the form of sprays.

Administration can be in the form of tablets, capsules, pills, suppositories, coated pills, liquid consonants or aerosol. As liquid consonants there can be employed oily or aqueous solutions or suspensions, emulsions, injectable aqueous or oily solutions or suspension.

PHARMACOLOGICAL ACTIVITY TEST METHODS

The compounds were tested for antiphlogistic action on the carrageenin edema of the rat paw according to the method of Domenjoz et al., Arch. Exp. Pharm. Path. 230, 325 (1957).

The test for analgesic effect followed the mouse tail test according to Haffner, Dtsch. Med. Wschr., 55, 731 (1929).

The antipyretic action on yeast feber of the rat was investigated by the procedure of Büch, Arch. Intern. Pharmcodyn, 123, 140 (1959).

The acute toxicity for mouse ($LD_{50}$ in mg./kg.) was ascertained graphically according to the procedure of Miller and Tainter, Proc. Soc. Exper. Biol. Med., 57; 261 (1944).

In all of the tests application was accomplished orally.

PHARMACOLOGICAL DATA

The compounds of the invention have strong antiphlogistic activity in the carrageenin edema of the rat paw in dosages between 2 and 300 mg./kg. The best of the compounds of the invention in this inflammation model at a dosage of 2 to 10 mg./kg. orally exhibited an edema arresting of 50%. A corresponding activity of the known antiphlogistic compound salicylamide in comparison is obtained only at a dosage of about 260 mg./kg. orally.

Furthermore several of the compounds of the invention are strongly analgesically active at dosages between 6 and 800 mg./kg. The best of the compounds effected a distinct analgesia in 50% of the treated mice in the dosage range between 6 and 10 mg./kg. A comparable activity is shown by the known analgesic, phenacetin at a dosage of about 700 mg./kg.

Additionally several of the compounds of the invention in the above-mentioned dosage range also are distinguished by having an antipyretic action. Through the antipyretic action the compounds are still more important.

The tolerance of the compounds of the invention is very favorable as shown by the relatively small toxicity in a mouse. The acute toxicity in the mouse lies, expressed as $LD_{50}$ between 100 and 4000 mg./kg. body weight when administered orally.

The single dose can lie between 1 and 300 mg. and can be administered one or more times a day in art known manner.

THERAPEUTIC PARTICULARS

The compounds of the invention act to arrest inflammation, as pain relievers and fever reducers and are indicated for the following sicknesses.

Indications as inflammation arresting medicaments:
    Chronic polyarthritis
    Rheumatic diseases
    Posttraumatic inflammations
    Swellings resulting from fractures
    Thrombophlebitis of all forms (including postoperative)
    Bursitis
    Synovitis
    Collagenoses (polymyositis) (periarteriitis)
    Gout
Indications as fever reducing medicaments
    (Antipyretic medicaments)
    Fevers in illnesses of all geneses
Indications as pain relieving medicaments
    Pains of all geneses.

Unless otherwise indicated all parts and percentages are by weight.

EXAMPLE 1

2-amino-3-carbethoxyamino-6-[1-phenyl-2-(p-methoxyphenyl)-ethylamino]-pyridine

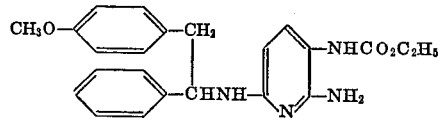

72 grams of 2-amino-3-nitro-6-[2-(p-methoxyphenyl)-1-phenylethylamino]-pyridine were hydrogenated in an autoclave with 20 grams of Raney nickel and 40 grams of $MgSO_4$ in 450 ml. of dioxane at 50° C. and 50 atmospheres (gauge). The hydrogenation solution was freed of catalyst and drying agent and mixed with 23.5 ml. of chloroformic acid ethyl ester (ethyl chloroformate) with stirring. After 30 minutes, the solution was treated with 1.5 liters of etha-benzene mixture (1:1). The solution was decanted from the separated syrupy precipitate. The syrupy precipitate was dissolved in 200 ml. of methanol, neutralized with ammonium hydroxide solution and the base shaken with 500 ml. of ether. The organic phase was washed three times with water whereby the desired product separated as crystals. It was filtered off with suction and recrystallized from n-propanol-dioxane. Yield 28 grams, M.P. 178–179° C.

EXAMPLE 2

2-amino-3-carbethoxyamino-6-(1,2-diphenyl-butylamino)-pyridine

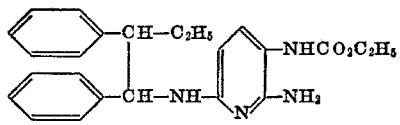

29 grams of 2-amino-3-nitro-6-(1,2-diphenyl butylamino)-pyridine were hydrogenated in a manner analogous to that of Example 1 and reacted with 8.6 ml. of ethyl chloroformate. The procedure was the same as in Example 1. The desired compound crystallized from the ether solution which was dried with magnesium sulfate and which had been treated with petroleum ether to the point of turbidity. Yield 8 grams, M.P. 164° C.

EXAMPLE 3

2-amino-3-carbethoxyamino-6-[1,2-bis-(p-methoxyphenyl)-butylamino]-pyridine

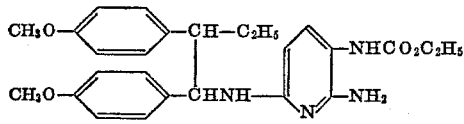

46 grams of 2-amino-3-nitro-6-[1,2-bis-(p-methoxyphenyl)-butylamino]-pyridine were hydrogenated in the manner described in Example 1, the product reacted with 12 ml. of ethyl chloroformate and worked up in the same manner as in Example 1. Yield 5.5 grams, M.P. 136° C.

EXAMPLE 4

2-amino-3-carbethoxyamino-6-[1,2-bis-(p-methoxyphenyl)-ethylamino]-pyridine

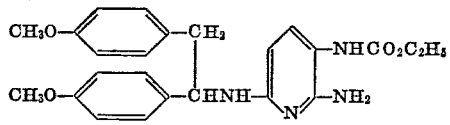

50 grams of 2 - amino-3-nitro-6-[1,2-bis-(p-methoxyphenyl)-ethylamino]-pyridine were hydrogenated in the same manner as Example 1 and the product reacted with 14 ml. of ethyl chloroformate and worked up as in Example 1. Yield 26 grams, M.P. 128–130° C.

EXAMPLE 5

2-amino-3-carbethoxyamino-6-(1-phenyl-2-p-tolyl-ethylamino)-pyridine hydrochloride

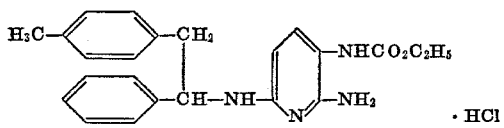

31 grams of 2-amino-3-nitro-6-(1-phenyl-2-p-tolylethylamino)-pyridine were hydrogenated in the manner set forth in Example 1. The hydrogenation solution was reacted with 9.5 ml. of ethyl chloroformate.

After 30 minutes the solution was treated with ether and benzine (1:1) to turbidity. The desired compound gradually crystallized out. It was filtered off with suction, washed with ether and dried. Yield 34 grams, M.P. 166–167° C.

EXAMPLE 6

2-amino-3-carbethoxyamino-6-[1,2-bis-(p-tolyl)-ethylamino]-pyridine hydrochloride

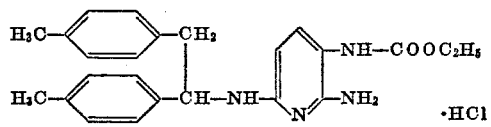

31 grams of 2-amino-3-nitro-6-[1,2-bis-(p-tolyl)-ethylamino]-pyridine were hydrogenated as in Example 1 and the hydrogenation solution reacted with 9.5 ml. of ethyl chloroformate. It was then worked up as in Example 5. Yield 34 grams, M.P. 138–145° C.

EXAMPLE 7

2-amino-3-carbethoxyamino-6-[1-phenyl-2-(p-methoxyphenyl)-ethylamino]-pyridine

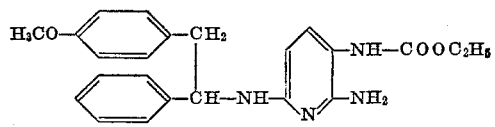

36 grams of 2-amino-3-nitro-6-[1-phenyl-2-(p-methoxyphenyl)-ethylamino]-pyridine were hydrogenated as in Example 1 and the solution reacted with 10.8 ml. of ethyl chloroformate. The product was worked up as in Example 1. Yield 17 grams, M.P. 109–110° C.

EXAMPLE 8

2-amino-3-carbethoxyamino-6-(1,2-diphenyl-2-hydroxyethylamino)-pyridine hydrochloride

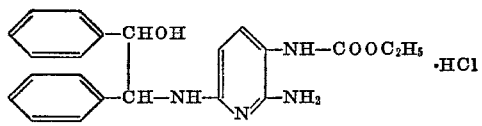

22 grams of 2-amino - 3 - nitro-6-(1,2-diphenyl-2-hydroxyethylamino)-pyridine were hydrogenated as in Example 1 and the filtered reaction solution reacted with 7 ml. of ethyl chloroformate with stirring, and worked up in the manner of Example 5. The reaction product crystallized out in pure foam. Yield 15 grams, M.P. 204–206° C.

EXAMPLE 9

2-amino-3-carbethoxyamino-6-[1,2-diphenyl-2-methoxyethyl-(1)-amino]-pyridine

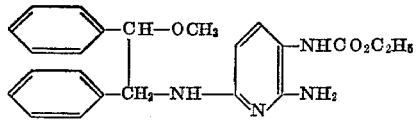

36 grams of 2-amino-3-nitro-6-[1,2-diphenyl-2-methoxyethyl-(1)-amino]-pyridine were catalytically hydrogenated in the presence of 10 grams of Raney nickel and 20 grams of magnesium sulfate at 50° C. and 40 atmospheres (gauge). The hydrogenation solution was freed of catalyst and drying agent and treated with 10.8 ml. of ethyl chloroformate with stirring. After 1 hour the product was precipitated as a syrup with ether and benzine (1:1), after settling the supernatant solution was decanted off. The syrup product was dissolved in a little methanol, treated with excess aqueous ammonia and water and the base formed shaken with ether. After washing and drying the ether solution, the base was fractionally crystallized by gradual addition of benzine. The first fraction consisted of the pure desired compound. Yield 8 grams, M.P. 158° C.

EXAMPLE 10

2-amino-3-carbethoxyamino-6-[1-phenyl-2-(p-chlorophenyl)ethyl-(1)-amino]-pyridine

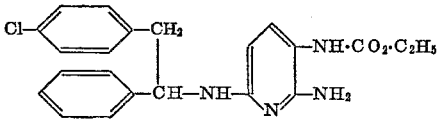

33 grams of 2-amino-3-nitro-[1-phenyl-2-(p-chlorophenyl)ethyl-(1)-amino]-pyridine were catalytically hydrogenated in the manner set forth in Example 9. The hydrogenation solution was treated with 9.8 ml. of ethyl chloroformate with stirring. After 1 hour the base was formal and it was crystallized from ether. Yield 28 grams, M.P. 169° C.

EXAMPLE 11

2-amino-3-ethoxyacetylamino-6-[1-phenyl-2-(p-chlorophenyl)-ethyl-(1)-amino]-pyridine hydrochloride

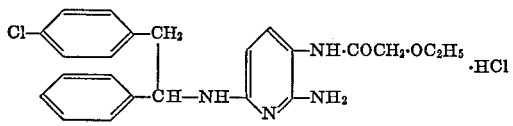

33 grams of 2-amino-3-nitro-6-[1-phenyl-2-(p-chlorophenyl)-ethyl-(1)-amino]-pyridine were hydrogenated in the manner set forth in Example 9 and the hydrogenation solution reacted with 11 ml. of ethoxyacetyl chloride with stirring. After 1 hour the mixture was treated with some ether whereby the hydrochloride of the reaction product crystallized out. Yield 34 grams, M.P. 168–169° C.

EXAMPLE 12

2-amino-3-carbethoxyamino-6-[1,2-bis-(p-fluorophenyl)-ethyl-(1)-amino]-pyridine malonate

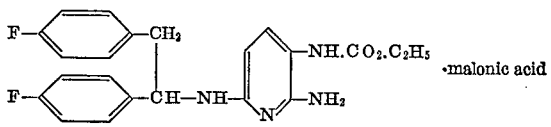

26 grams of 2-amino-3-nitro-6-[1,2-bis-(p-fluorophenyl)-ethyl-(1)-amino]-pyridine were catalytically hydrogenated in the manner set forth in Example 9 tnd the filtered hydrogenation solution reacted with 8 ml. of ethyl chloroformate with stirring. After 1 hour the syrupy reaction product was precipitated by the addition of ether and benzine (1:1) and the base produced in the manner set forth in Example 9. Through addition of the ethereal solution to a solution of 10 grams of malonic acid in 50 ml. of dioxane there was obtained the malonate. It was recrystallized from isopropanol. Yield 16 grams, M.P. 130° C.

EXAMPLE 13

2-amino-3-carbethoxyamino-6-[1-phenyl-2-(p-fluorophenyl)-ethyl-(1)-amino]-pyridine malonate

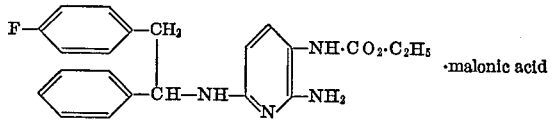

25.5 grams of 2-amino-3-nitro-6-[1-phenyl-2-(p-fluorophenyl)-ethyl-(1)-amino]-pyridine were catalytically hydrogenated in the manner set forth in Example 9 and the hydrogenation solution reacted with 8 ml. of ethyl chloroformate with stirring. The syrupy reaction product was precipitated by the addition of ether and the malonate produced therefrom with a solution of malonic acid in dioxane. The malonate was recrystallized from isopropanol. Yield 17 grams, M.P. 81–83° C.

EXAMPLE 14

2 - amino - 3 - carbethoxyamino - 6 - [1 - (p - fluorophenyl) - 2 - (p - chlorophenyl) - ethyl - (1) - amino]-pyridine malonate

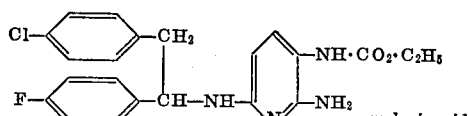

46.5 grams of 2-amino-3-nitro-6-[1-(p-fluorophenyl)-2-(p - chlorophenyl) - ethyl - (1) - amino]-pyridine were catalytically hydrogenated in the manner set forth in Example 9, the hydrogenation solution jointly with stirring reacted with 13 ml. of ethyl chloroformate. The crystalline malonate of the reaction product was obtained from the reaction product precipitated with ether and benzine (1:1) by treatment with a solution of malonic acid in dioxane. Yield 39 grams, M.P. 145–147° C.

EXAMPLE 15

2 - amino - 3 - carbethoxyamino - 6 - [1 - (p - methoxyphenyl) - 2 - (p - chlorophenyl) - ethyl - (1) - amino]-pyridine

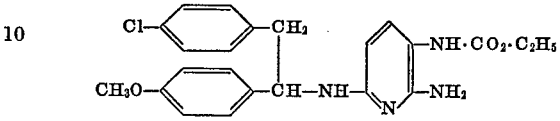

35 grams of 2-amino-3-nitro-6-[1-(p-methoxyphenyl)-2 - (p - chlorophenyl) - ethyl - (1)-amino]-pyridine were hydrogenated in Example 9 and the filtered hydrogenation solution reacted with 10 ml. of ethyl chloroformate with stirring. After 1 hour the base was produced by working up as in Example 9. The base crystallized from the ether solution. Yield 21 grams, M.P. 158–159° C.

EXAMPLE 16

2 - amino - 3 - carbethoxyamino - 6 - [1 - phenyl - 2-(3 - chloro - 4 - methylphenyl) - ethyl - (1) - amino]-pyridine

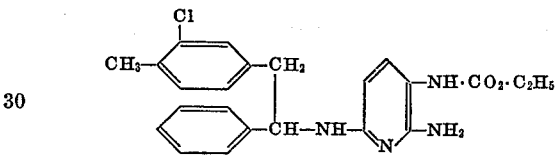

41 grams of 2-amino-3-nitro-6-[1-phenyl-2-(3-chloro-4 - methylphenyl) - ethyl - (1)-amino]-pyridine were catalytically hydrogenated in a manner analogous to Example 9 and the hydrogenation solution reacted with 11.5 ml. of ethyl chloroformate. From the reaction mixture, the base was produced in a manner analogous to Example 9 and the base was crystallized from the ether solution. Yield 23 grams, M.P. 124–126° C.

EXAMPLE 17

2 - amino - 3 - carbethoxyamino - 6 - [1 - p - tolyl - 2-(p - chlorophenyl) - ethyl - (1) - amino]-pyridine

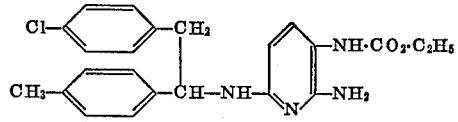

40 grams of 2-amino-3-nitro-6-[1-p-tolyl-2-(p-chlorophenyl)-ethyl-(1)-amino]-pyridine were catalytically hydrogenated in the manner of Example 9 and the hydrogenation solution reacted with 15 ml. of ethyl chloroformate. The base was produced from the reaction mixture in a manner analogous to Example 9 and was crystallized from the ether solution. Yield 20 grams, M.P. 148–149° C.

EXAMPLE 18

2-amino-3-β-oxo-butyrylamino-6-[1-p-tolyl-2-(p-chlorophenyl)-ethyl-(1)-amino]-pyridine

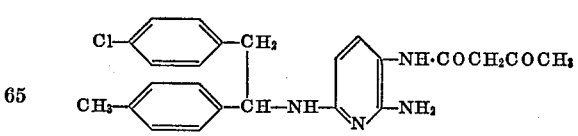

40 grams of 2 - amino-3-nitro-6-[1-p-tolyl-2-(p-chlorophenyl)-ethyl-(1)-amino]-pyridine were catalytically hydrogenated by the process of Example 9 and the hydrogenation solution after filtration was reacted with 7.6 grams of freshly distilled diketene. After 5 hours, the solvent was carefully removed in a vacuum and the residue taken up in 300 ml. of benzene. The reaction product crystallized after the addition of 100 ml. of benzine and

EXAMPLE 19

2-amino-3-β-hydroxybutyrylamino-6-[1-p-tolyl-2-(p-chlorophenylethyl-(1)-amino]-pyridine

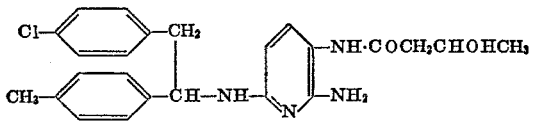

16 grams of the compound obtained in Example 18 were reduced in 400 ml. of methanol containing 5 grams of sodium boranate at 20–40° C. After the thin layer chromatographically ascertained end of the reaction water precipitation was employed. The oily product crystallized from an ether-dioxane mixture (1:1). Yield 9 grams, M.P. 115–117° C.

EXAMPLE 20

2-amino-3-carbethoxyamino-6-(3,4,5-trimethoxybenzyl-amino)-pyridine hydrochloride

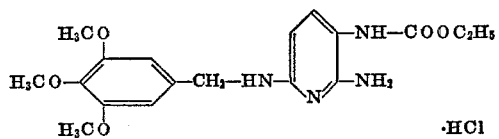

42 grams of 2-amino-3-nitro-6-(3,4,5-trimethoxybenzyl-amino)-pyridine were hyrogenated in 450 ml. of dioxane in an autoclave at 50° C. and 40 atmospheres (gauge) with 15 grams of Raney nickel and 40 grams of magnesium sulfate. The hydrogenation solution was freed of catalyst and drying agent and treated with 11.5 ml. of ethyl chloroformate with stirring. 200 ml. of ether were added whereupon the product began to crystallize out. After one hour's stirring it was filtered off under vacuum. The compound was recrystallized from ethyl alcohol. Yield 27 grams, M.P. 196° C.

EXAMPLE 21

2-amino-3-carbethoxyamino-6-(2,3,5-triethoxy-benzyl-amino)-pyridine hydrochloride

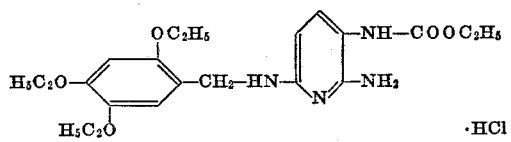

45 grams of 2-amino-3-nitro-6-(2,3,5-triethoxybenzyl-amino)-pyridine were hydrogenated as in Example 20 and the hydrogenation solution treated with 13 ml. of ethyl chloroformate. The reaction product crystallized after the addition of ether. Yield 18 grams, M.P. 162–163° C.

EXAMPLE 22

2-amino-3-carbethoxyamino-6-(2,4,6-trimethylbenzyl-amino)-pyridine hydrochloride

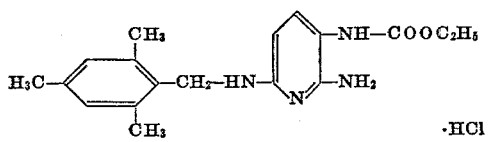

40 grams of 2-amino-3-nitro-6-(2,4,6-trimethylbenzyl-amino)-pyridine were hydrogenated as set forth in Example 20 and the Raney nickel solution reacted with 13 ml. of ethyl chloroformate. The precipitated product was recrystallized from methanol. Yield 38 grams, M.P. 203–204° C.

EXAMPLE 23

2-amino-3-acetoacetylamino-6-(2,4,6-trimethylbenzyl-amino)-pyridine

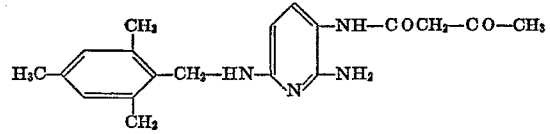

The reaction solution prepared in Example 22 was reacted with 12 ml. of freshly distilled diketene. After one hour's stirring, the mixture was acidified with 40 ml. of 6 N isopropanolic·HCl and the syrupy hydrochloride precipitated with ether. The syrup was dissolved in a little methanol, alkalized with aqueous ammonia and shaken with 200 ml. of ether. The ether extract was washed with water and dried. The material crystallized therefrom as the base on the addition of benzine. Yield 20 grams, M.P. 161–162° C.

EXAMPLE 24

2-methylamino-3-carbethoxyamino-6-(2,4,6-trimethyl-benzylamino)-pyridine hydrochloride

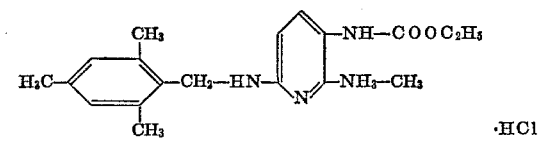

23 grams of 2-methylamino-3-nitro-6-(2,4,6-trimethyl-benzylamino)-pyridine were hydrogenated as in Example 20. The filtered solution was treated with 7 ml. of ethyl chloroformate. After 30 minutes, it was treated with ether and benzine (1:1) to turbidity whereupon the product crystallized out. It was recrystallized from methanol. Yield 19 grams, M.P. 148° C.

EXAMPLE 25

2-amino-3-carbethoxyamino-6-(2,6-dimethyl-4-methoxy-benzylamino)-pyridine

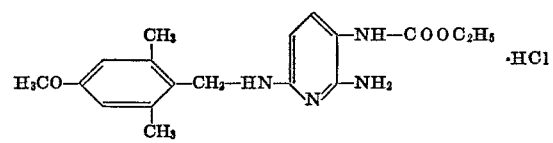

30 grams of 2-amino-3-nitro-6-(2,6-dimethyl-4-methoxybenzylamino)-pyridine were hydrogenated as in Example 24 and the filtered solution treated with 11 ml. of ethyl chloroformate. After 1 hour's reaction time, the product was worked up as in Example 24. Yield 23 grams, M.P. 186–189° C.

EXAMPLE 26

2-amino-3-acetoacetylamino-6-(2,6-dimethyl-4-methoxy-benzylamino)-pyridine

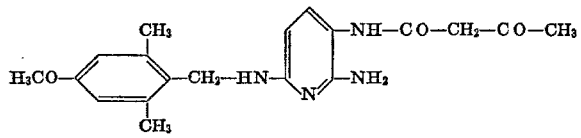

A hydrogenation mixture prepared in identical manner to Example 25 was filtered and then reacted with 9 ml. of freshly distilled diketene. After one hour's stirring, it was treated with a 6 N HCl solution in isopropanol until acid reaction. The hydrochloride precipitated as a syrup upon the addition of ether. The precipitate was dissolved in a little methanol and made alkaline with aqueous ammonia. The base crystallized slowly through rubbing and cooling. It was recrystallized from dioxane-ether-benzine. Yield 10 grams, M.P. 159–161°C.

EXAMPLE 27

2-amino-3-ethoxyacetylamino-6-(2,4,6-trimethyl-benzylamino)-pyridine hydrochloride

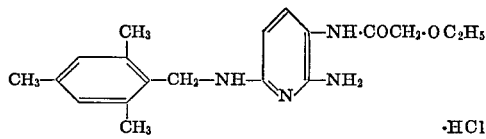

The hydrogenation solution prepared in Example 22 was reacted with stirring with 17 ml. of ethoxyacetyl chloride. After several minutes, the reaction product began to crystallize out. After 1 hour, it was removed by suction filtration and recrystallized from ethanol. Yield 35 grams, M.P. 216° C.

EXAMPLE 28

2-amino-3-(o-methoxy-benzoylamino)-6-(2,4,6-trimethyl-benzylamino)-pyridine hydrochloride

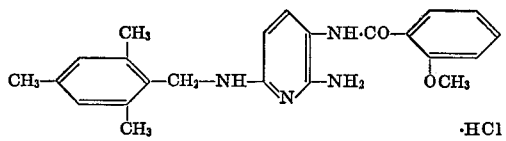

The hydrogenation solution of Example 22 was reacted with stirring with 15.7 grams of o-methoxy benzoyl chloride. After some time, the reaction product was crystallized by rubbing. It was recrystallized from methanol. Yield 48 grams, M.P. 189–191° C.

EXAMPLE 29

2-amino-3-carbethoxyamino-6-(2,3,5,6-tetramethyl-benzylamino)-pyridine hydrochloride

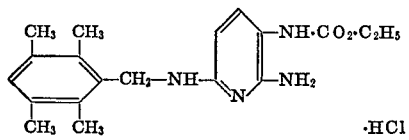

40 grams of 2-amino-3-nitro-6-(2,3,5,6-tetramethylbenzylamino)-pyridine were hydrogenated with 15 grams of Raney nickel and 40 grams of MgSO$_4$ in 450 ml. of dioxane in an autoclave at 50° C. and 40 atmospheres (gauge). Then the filtered hydrogenation solution was reacted with 14.4 ml. of ethyl chloroformate with stirring. The reaction product precipitated immediately as a gel and became crystalline with long stirring. It was recrystallized from ethyl alcohol-water. Yield 30 grams, M.P. 185–186° C.

EXAMPLE 30

2-amino-3-carbethoxyamino-6-(2,3,4,5,6-pentamethyl-benzylamino)-pyridine hydrochloride

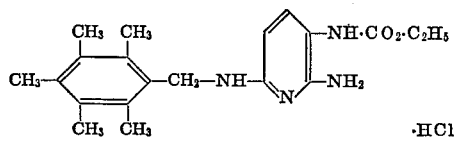

49 grams of 2-amino-3-nitro-6-(2,3,4,5,6-pentamethylbenzylamino)-pyridine were hydrogenated with 15 grams of Raney nickel and 40 grams of MgSO$_4$ in 450 ml. of dioxane in an autoclave at 50° C. and 40 atmospheres (gauge). The hydrogenation solutions after filtration was reacted with 15 ml. of ethyl chloroformate with stirring. The product precipitated first as a gel and after standing several hours crystallized. It was recrystallized from ethanol. Yield 31 grams, M.P. 211–213° C.

EXAMPLE 31

2-amino-3-carbethoxyamino-6-(2,6-dimethyl-4-ethyl-benzylamino)-pyridine hydrochloride

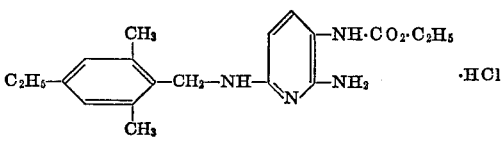

27 grams of 2 - amino - 3 - nitro - 6 - (2,6 - dimethyl-4-ethyl-benzylamino)-pyridine were hydogenated with 15 grams of Raney nickel and 40 grams of MgSO$_4$ in 450 ml. of dioxane in an autoclave at 50° C. and 40 atmospheres (gauge) and the reaction solution reacted with 10 ml. of ethyl chloroformate with stirring. The reaction product crystallized after the addition of ether and benzene. It wa sfiltered off with suction and recrystallized from ethyl alcohol-water. Yield 11 grams, M.P. 133–135° C.

EXAMPLE 32

2-amino-3-carbethoxyamino-6-(2,6-dimethyl-4-isopropyl-benzylamino)-pyridine hydrochloride

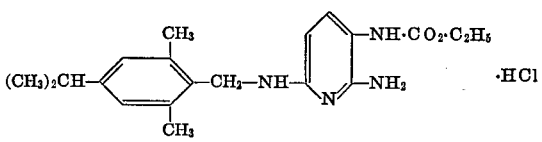

35 grams of 2-amino-3-nitro - 6 - (2,6-dimethyl-4-isopropylbenzylamino)-pyridine were hydrogenated in the same manner as Example 31 and the filtered hydrogenation solution reacted with 12 ml. of ethyl chloroformate. After 1 hour, the product was treated with ether and benzine until the beginning of crystallization. The product was filtered off with suction and washed with ether. Yield 32.8 grams, M.P. 212° C.

EXAMPLE 33

2-amino-3-carbethoxyamino-6-(2,4,5-benzylamino)-pyridine hydrochloride

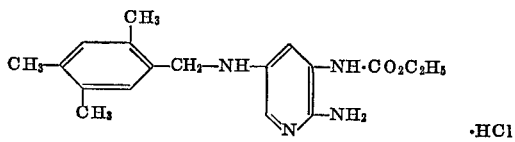

32 grams of 2-amino-3-nitro-6-(2,4,5-trimethylbenzylamino)-pyridine were hydrogenated in the same manner as Example 31 and the filtered hydrogenation solution reacted with 10.5 ml. of ethyl chloroformate. The reaction product crystallized with rubbing after addition of ether. It was recrystallized from methanol. Yield 10 grams, M.P. 214° C.

EXAMPLE 34

2-amino-3-carbethoxyamino-6-(2,3,4-trimethylbenzylamino)-pyridine hydrochloride

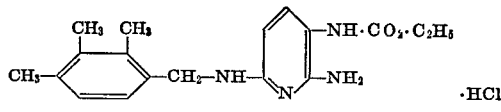

36 grams of 2-amino-3-nitro-6-(2,3,4-trimethylbenzylamino)-pyridine were hydrogenated in the same manner as in Example 31 and the filtered hydrogenation solution reacted with 13 ml. of ethyl chloroformate. The reaction product crystallized out. It was recrystallized from ethyl alcohol. Yield 27 grams, M.P. 218–219° C.

EXAMPLE 35

2-amino-3-carbethoxyamino-6-(α,2,4,6-tetra-
methylbenzylamino)-pyridine malonate

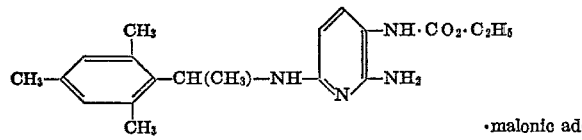

·malonic acid 48 grams of 2-amino-3-nitro-6-(α,2,4,6-tetramethylbenzylamino)-pyridine were hydrogenated in the same manner as in Example 31 and the hydrogenation solution reacted with 17.5 ml. of ethyl chloroformate. After 2 hours, the syrupy reaction production precipitated, dissolved in a little methanol, made alkaline with aqueous ammonia and taken up in ether. The dried ether solution of the base was added to a solution of 15 grams of malonic acid in dioxane whereupon the malonate crystallized out. This was recrystallized from ethyl alcohol. Yield 41 grams, M.P. 160–162° C.

EXAMPLE 36

2-amino-3-carbethoxyamino-6-(2,4,6-triethyl-
benzylamino)-pyridine hydrochloride

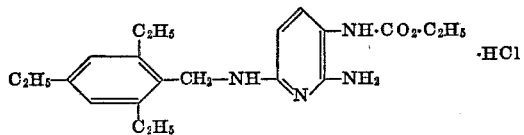

·HCl 43 grams of 2-amino-3-nitro - 6 - (2,4,6-triethylbenzylamino)-pyridine were hydrogenated in the same manner as in Example 31 and the filtered hydrogenation solution reacted with 14.5 ml. of ethyl chloroformate with stirring. The reaction product crystallized after addition of ether and rubbing. Yield 36 grams, M.P. 162° C.

EXAMPLE 37

2-amino-3-carbethoxyamino-6-(2,3,4,5,6-penta-
fluorobenzylamino)-pyridine hydrochloride

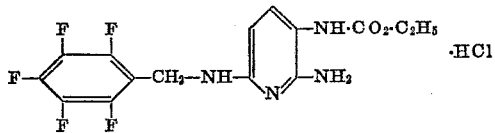

·HCl 11.5 grams of 2-amino-3-nitro-6-(2,3,4,5,6-pentafluorobenzylamino)-pyridine were hydrogenated analogously to Example 20 and the filtered hydrogenation solution reacted with 4 ml. of ethyl chloroformate with stirring. The material crystallized after addition of ether with rubbing. After several hours, it was filtered off with suction and recrystallized from water. Yield 6 grams, M.P. 204° C.

EXAMPLE 38

2-amino-3-carbethoxyamino-6-(3-chloro-2,4,6-trimethyl-
benzylamino)-pyridine hydrochloride

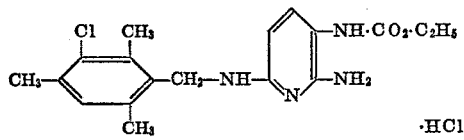

·HCl 15 grams of 2-amino-3-nitro-6-(3-chloro-2,4,6-trimethyl-benzylamino)-pyridine were hydrogenated in the same manner as Example 31 and the hydrogenation solution reacted with 5 ml. of ethyl chloroformate with stirring. The reaction product precipitated as a gel but crystallized in 20 minutes. It was filtered off with suction and recrystallized from methanol-water. Yield 10 grams, M.P. 212° C.

EXAMPLE 39

2-amino-3-carbethoxyamino-6-(3-fluoro-2,4,6-trimethyl-
benzylamino)pyridine hydrochloride

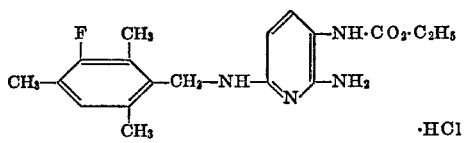

·HCl 19.5 grams of 2 - amino-3-nitro-6-(3-fluoro-2,4,6-trimethyl-benzylamino)-pyridine were hydrogenated in the same manner as Example 31 and the filtered hydrogenation solution reacted with 7 ml. of ethyl chloroformate with stirring and the crystallized reaction product filtered off with suction. It was twice recrystallized from ethyl alcohol-water by addition of some aqueous hydrochloric acid. Yield 9.5 grams, M.P. 209° C.

EXAMPLE 40

2-amino-3-carbethoxyamino-6-(2-fluoro-4,6-dimethyl-
menzylamino)-pyridine hydrochloride

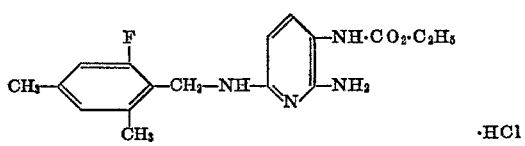

·HCl 13.5 grams of 2-amino-3-nitro-6-(2-fluoro-4,6-dimethyl-benzylamino)-pyridine were hydrogenated in the same manner as Example 31. The filtered hydrogenation solution was reacted with 4.5 ml. of ethyl chloroformate. By the addition of ether and benzine, the reaction product was crystallized. Yield 11 grams, M.P. 196–198° C.

EXAMPLE 41

2-amino-3-carbethoxyamino-6-(2,4-dimethyl-5-chloro-
benzylamino)-pyridine hydrochloride

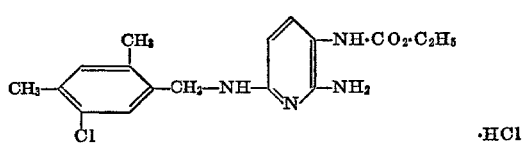

·HCl 13.5 grams of 2-amino-3-nitro-6-(2,4-dimethyl-5-chlorobenzylamino)-pyridine were hydrogenated in the same manner as Example 31. The filtered hydrogenation solution was reacted with 4.6 ml. of ethyl cholroformate. The product crystallized out after a few minutes. It was filtered off with suction and recrystallized from ethyl alcohol. Yield 7 grams, M.P. 218° C.

The starting nitro compounds can be prepared for example in the manner shown in parent application 762,321, Example 15.

As additional compounds within the invention to those set forth in the examples above there can be mentioned 2-amino-3-carbmethoxyamino-6-(3-bromo-2,4,6-tributyl)-benzylamino)-pyridine,
2-amino-3-carbutoxy-6-[1-phenyl-2-(p-propoxyphenyl) ethylamino] pyridine,
2-amino-3-carbethoxy amino-6-[1-hydroxyphenyl-2-(o-hexoxyphenyl)-ethylamino] pyridine,
2-methylamino-3-acetylamino-6-[1-m-propyl-2-(hydroxyphenyl) ethyl-(1)-amino] pyridine,
2-hexylamino-3-hexoylamino-6-(2-chloro-3-propionyl-5-propyl-benzylamino) pyridine,
2-amino-3-carbphenoxyamino-6-(2,3-dihydroxy-4,5-diethyl-benzylamino) pyridine,
2-ethylamino-3-carb-p-tolyloxyamino-6-[1-p-trifluoroethylphenyl-2-(m-chlorophenyl) ethyl-(1)-amino] pyridine, 2-amino-3-morpholino-carbonylamino-6-(3,4,5-triethoxy-benzylamino)-pyridine, 2-amino-3-piperidino carbonylamino-6-(3-methyl-4-ethyl-5-sec. butyl-benzylamino) pyridine, 2-amino-3-carbpropoxy-6-[1-(3,4,5-trimethyl phenyl)-3-(3,4,6-tripropyl phenyl) propylamino)-pyridine.

What is claimed is:

1. A compound having the formula:

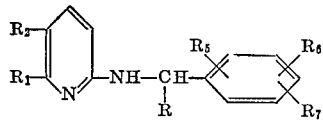

and their pharmaceutically acceptable acid addition salts where $R_1$ is amino, $R_2$ is $R_{10}NH$, where $R_{10}$ is carbo lower alkoxy, acetoacetyl, lower alkoxy acetyl, lower alkoxy benzoyl, carbphenoxy, acetyl or beta hydroxy butyryl, $R_4$ is hydrogen, lower alkyl or

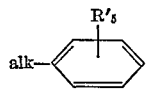

where alk is a 1 to 3 carbon atom alkylene group, $R'_5$ is hydrogen or halogen, $R_5$ is hydrogen, halogen, methyl or ethyl, $R_6$ is hydrogen, halogen, methyl or ethyl and $R_7$ is hydrogen, halogen, methyl, ethyl or isopropyl.

2. A compound according to claim 1 wherein $R_{10}$ is acetoacetyl, lower alkoxyacetyl, lower alkoxy benzoyl, acetyl or beta hydroxy butyryl.

3. A compound according to claim 1 wherein $R_{10}$ is carbo lower alkoxy and all 3 of $R_5$, $R_6$ and $R_7$ are not hydrogen.

4. A compound according to claim 3 wherein $R_4$ is hydrogen or lower alkyl.

5. A compound according to claim 1 wherein $R_5$, $R_6$ and $R_7$ are all methyl.

6. A compound according to claim 1 wherein $R_4$ is hydrogen or lower alkyl and all 3 of $R_5$, $R_6$ and $R_7$ are not hydrogen.

7. A compound according to claim 1 wherein $R_4$ is hydrogen or lower alkyl.

8. A compound according to claim 7 wherein $R_4$ is hydrogen.

References Cited

UNITED STATES PATENTS 3,513,171  5/1970  Thiele et al. ____ 260—295.5 C

OTHER REFERENCES

Roberts et al.: Basic Principles of Organic Chemistry, Benjamin Publishers, p. 806, 1965.

ALAN L. ROTMAN, Primary Examiner

U.S. Cl. X.R.

260—295.5 A, 295 AM, 295 CA; 424—266

UNITED STATES PATENT OFFICE
CERTIFICATE OF CORRECTION

Patent No. 3,787,429      Dated January 22, 1974

Inventor(s) Kurt Thiele et al

It is certified that error appears in the above-identified patent and that said Letters Patent are hereby corrected as shown below:

Claim 28, first formula, "R" should read --$R_4$--.

Signed and sealed this 16th day of July 1974.

(SEAL)
Attest:

McCOY M. GIBSON, JR.
Attesting Officer

C. MARSHALL DANN
Commissioner of Patents